United States Patent

Nishida et al.

[11] Patent Number: 4,998,800
[45] Date of Patent: Mar. 12, 1991

[54] OPTICAL LOW PASS FILTER

[75] Inventors: Yasuaki Nishida, Tokyo; Katsuya Fujisawa, Okayama; Yoshihiro Fujita, Tokyo; Masao Fujiwara, Tokyo; Shigeo Yoshikawa, Tokyo; Masao Uetsuki, Okayama, all of Japan

[73] Assignees: Nippon Hoso Kyokai, Tokyo; Kuraray Company, Ltd., Kurashiki, both of Japan

[21] Appl. No.: 331,961

[22] Filed: Apr. 3, 1989

[30] Foreign Application Priority Data

Apr. 4, 1988 [JP] Japan .................................. 63-83785

[51] Int. Cl.5 .............................................. G02B 27/60
[52] U.S. Cl. ........................... 350/162.2; 350/162.19; 358/47; 358/331
[58] Field of Search ........... 350/162.2, 162.17, 162.19; 358/47, 331

[56] References Cited

U.S. PATENT DOCUMENTS

| | | | |
|---|---|---|---|
| 3,756,695 | 9/1973 | Mino et al. | 350/162.2 |
| 3,768,888 | 10/1973 | Nishino et al. | 350/162.2 |
| 3,821,795 | 6/1974 | Okano | 350/162.2 |
| 3,910,683 | 10/1975 | Nishino et al. | 350/162.2 |
| 3,940,788 | 2/1976 | Abe et al. | 350/162.2 |
| 4,093,346 | 6/1978 | Nishino et al. | 350/162.2 |
| 4,178,611 | 12/1979 | Okano | 350/162.2 |
| 4,255,019 | 3/1981 | Knop | 350/162.2 |
| 4,795,236 | 1/1989 | Ise | 350/162.2 |
| 4,850,673 | 7/1989 | Velzel et al. | 350/162.17 |

*Primary Examiner*—Bruce Y. Arnold
*Assistant Examiner*—Terry S. Callaghan
*Attorney, Agent, or Firm*—Oblon, Spivak, McClelland, Maier & Neustadt

[57] ABSTRACT

An optical low pass filter for use in an imaging device including an objective lens and a solid state image sensor forming a plurality of picture elements thereon, which filter comprises a diffraction grating disposed between the objective lens and the solid state image sensor. The diffraction grating is of a type which the periodicity of an image of the diffraction grating projected onto the solid state image sensor by the objective lens is selected to be twice or 1/n of the periodicity of the picture element, wherein n represents an integer. The applicable imaging device may be of a type comprising an objective lens, a solid state image sensor forming a plurality of picture elements thereon, and a color filter array disposed on the solid state image snesor and including a plurality of sets of different color filter elements, or of a type comprising a single tube type color imaging device having an evacuated glass envelope, an objective lens and a color filter array including a plurality of sets of different color filter elements.

8 Claims, 10 Drawing Sheets

Fig. 6
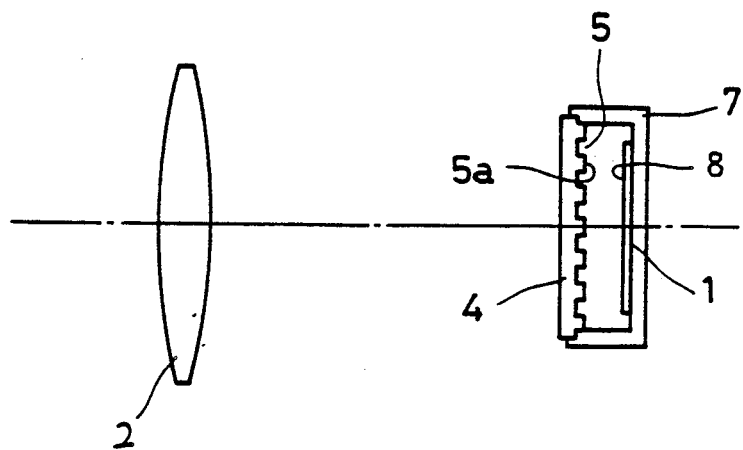
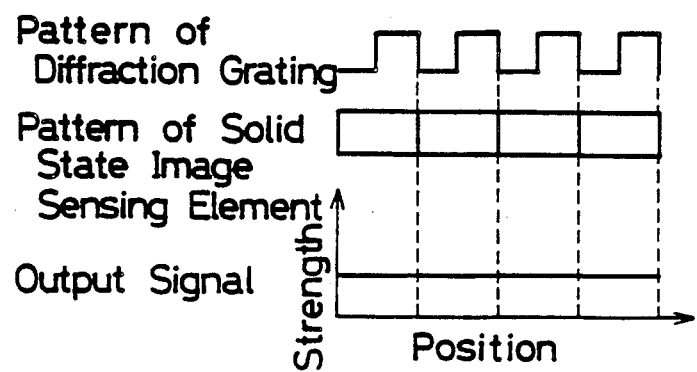
Fig. 7(a)
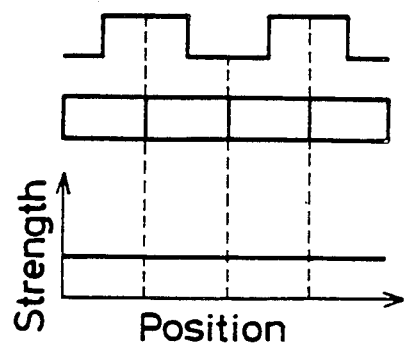
Fig. 7(b)

Pattern of Diffraction Grating

Pattern of Color Stripe Filters
Pattern of Solid State Image Sensor

R Color Signal

G Color Signal

B Color Signal

Luminance Signal

  (Masking & Exposure)
  (Interference Exposure)
  (Development)

OPTICAL LOW PASS FILTER

BACKGROUND OF THE INVENTION

1. Field of the Invention

The present invention relates to an optical low pass filter for use in an imaging device such as, a solid state imaging device or a single tube type color imaging device, for alleviating spurious mono color signals and-/or spurious color signals.

2. Description of the Prior Art

It is well known that a solid state imaging device and a single tube type color imaging device employ an array of color filters to give color signals. If radiations from the scene to be imaged or photographed such as, for example, a person, or a group of persons and/or a landscape, contains a component of frequency substantially equal to the pitch of each neighboring filter of the filter array, the subsequent detection of this frequency component tends to result in a generation of a spurious color signal.

It is also well known that a single flat panel type color imaging device employs a solid state image sensor with their picture elements or sensing cells arranged discretely and regularly and, therefore, if radiations from the scene to be imaged or photographed contains a high frequency component of a periodicity smaller than the pitch (periodicity) of each neighboring picture elements of the solid state image sensor, the subsequent detection of this high frequency component tends to result in a generation of a spurious signal due to recurrent.

In view of a foregoing, the solid state imaging device or a single tube type color imaging device generally employs an optical low pass filter with the aim of substantially limiting the high frequency component contained in the radiations from the scene to be imaged or photographed, thereby alleviating the generation of the spurious color signal or the spurious mono color signal, respectively.

FIG. 1 of the accompanying drawings illustrate, in schematic longitudinal representation, a prior art solid state imaging device (See the Japanese Laid-open Patent Publication No. 61-149923, published July 8, 1986). The device of FIG. 1 is a solid state image sensor, which comprises a casing 7, which opens towards a pick-up lens or photo-taking lens 2, and an array of color filters, generally identified by 3 and housed within the casing 7 so as to face towards the opening of the casing 7 that is closed by a transparent protective glass 4. Positioned between the photo-taking lens 2 and the solid state image sensor 1 is an optical low pass filter 6. The prior art optical low pass filter 6 shown therein is generally employed in the form of a birefringent plate such as made of quartz and is, therefore, not only expensive to make, but also incapable of being manufactured on a mass production basis.

Accordingly, attempts have been made to provide an optical low pass filter wherein, in place of the birefringent plate, an inexpensive and mass-produceable diffraction grating is employed. (See the Japanese examined Patent Publication No. 61-38452, published Aug. 29, 1986, which corresponds to the U.S. patent application No. 28,368, filed Apr. 9, 1979 now U.S. Pat. No. 4,255,109).

In the prior art color imaging device employing the diffraction grating, in place of the birefringent plate, for the low pass filter 6, it has been found that, although a low frequency bandpass characteristic exhibited thereby is satisfactory, there is a problem in that, when a diaphragm employed in the color imaging system is stopped down, an image of the diffraction grating tends to appear within the frame of a picture being taken of the scene. This phenomenon will now be discussed in detail.

Referring to FIG. 2, there is shown a graph illustrating the modulation transfer function (MTF) characteristics of the diffraction grating of a type having a generally rectangular wavy cross-section (a generally battlement-like cross-section), wherein fc1 and fc2 represent respective cut-off frequencies. Each of these cut-off frequencies fc1 and fc2 can be expressed by the following respective equation.

$$fc1 = a/b\lambda \qquad (1)$$

$$fc2 = (d-a)/b\lambda \qquad (2)$$

wherein d represents the periodicity of the diffraction grating, a represents the width of each of elongated parallel projections of the diffraction grating, b represents the distance between the diffraction grating and the image plane of the imaging system or the front surface of the solid state image sensor where an image of the scene is formed by the photo-taking lens, and $\lambda$ represents the wavelength of the incident light radiated from the scene to be photographed.

Accordingly, once the distance b between the diffraction grating and the image plane of the imaging system is determined, optimization of the periodicity d and the width a of each elongated projection of the diffraction grating is effective to alleviate the generation of the spurious color signal and/or the spurious mono color signal.

The prior art color imaging device wherein the optical low pass filter is employed in the form of the diffraction grating is illustrated in FIG. 3 in schematic longitudinal representation. The diffraction grating identified by 5 is disposed so as to intervene between the photo-taking lens 2 and the transparent protective glass plate 4 secured to the casing for the solid state image sensor 1 and, therefore, the distance b between the diffraction grating 5 and the image plane 8 of the imaging system necessarily tends to be relatively long, for example, 1 mm or more, and, accordingly, the periodicity of the diffraction grating 5 determined by the equations (1) and (2) above generally amounts to a value three times the periodicity of the picture elements of the solid state image sensor 1. This in turn results in that the periodicity of the image of the diffraction grating 5 projected by the photo-taking lens 2 onto the solid state image sensor 1 (that is, the effective periodicity of the diffraction grating 5) tends to be large enough to assume a value three times or more than the periodicity of the picture elements of the solid state image sensor 1.

An example of an output signal outputted from the solid state image sensor 1 when the effective periodicity of the diffraction grating 5 is three times the periodicity of the picture elements is shown in FIG. 4. As shown therein, since the output signal from the solid state image sensor 1 is modulated in strength by the diffraction grating 5, an image of the diffraction grating 5 appears in the form of a pattern of alternating dark and bright irregularities within the frame of the picture being taken of the scene. A similar phenomenon occurs even where the effective periodicity of the diffraction grating employed in the solid state imaging device is of a value greater than 3 times the periodicity of the picture elements by the same reasoning.

Even in the single flat panel type color imaging device referred to hereinbefore, the distance between the diffraction grating and the image plane of the imaging system is generally 1 mm or more. Therefore, when the periodicity d of the diffraction grating 5 is calculated on the basis of the previously described equations (1) and (2) to determine the appropriate cut-off frequencies, the result shows that the periodicity d tends to be of a value equal to or greater than three times the periodicity of the picture elements of the solid state image sensor. This will be hereinafter discussed with reference to the prior art single flat panel type color imaging device wherein an RGB filter array made up of a plurality of triads of red (R), green (G) and blue (B) stripe filter elements is employed as a color filter array.

FIG. 5 illustrates R, G and B output signals generated from the single flat panel type color imaging device when the effective periodicity of the diffraction grating is four times the periodicity of the picture elements. The luminance signal corresponding to each triad of different color filter elements of the color filter array is modulated in strength and, therefore, a pattern of alternating dark and bright irregularities appears within the frame of the picture being taken of the scene, which irregularities represent an image of the diffraction grating.

SUMMARY OF THE INVENTION

The present invention has been devised with a view to substantially alleviating the above discussed problems inherent in the prior art imaging devices and is essentially intended to provide an improved optical low pass filter that is inexpensive to manufacture, capable of being mass-produced and reliable in that no image of the diffraction grating will appear within the frame of the picture being taken of the scene.

According to the present invention, the above described object can be advantageously accomplished by providing an improved optical low pass filter designed to have an effective periodicity equal to two times or 1/n (n being an integer) times the periodicity of the picture elements of the solid state image sensor or the periodicity of each triad of different color filter elements of the color filter array disposed on the image sensor.

It is to be noted that the term "effective periodicity" used hereinabove and hereinafter in connection with the diffraction grating is to be understood as meaning the periodicity of an image of the diffraction grating projected onto the image plane of the imaging system, which periodicity does not necessarily coincide with the periodicity of the diffraction grating. The effective periodicity Ec of the diffraction grating can be generally expressed by the following equation:

$$Ec = [f/(f-b)] \times d$$

wherein Ec represents the effective periodicity of the diffraction grating, f represents the focal length of the photo-taking lens, b represents the distance between the diffraction grating and the image plane of the imaging system and d represents the periodicity of the diffraction grating.

Where the effective periodicity of the diffraction grating is selected to be of a value 1/n times the periodicity of the picture elements of the solid state image sensor or the periodicity of each triad of the filter elements of the color filter array, the image of the scene to be photographed which is projected by the photo-taking lens onto the picture element of the solid state image sensor or onto each triad of the different color filter elements of the color filter array through the diffraction grating can be equally modulated in strength by the diffraction grating and, therefore, no pattern of alternating dark and bright irregularities will appear within the frame of the picture being taken of the scene.

On the other hand, where the effective periodicity of the diffraction grating is selected to be of a value two times the periodicity of the picture elements of the solid state image sensor or the periodicity of the different color filter elements of the color filter array, the image of the scene to be photographed which is projected by the photo-taking lens in a similar manner as hereinabove described is modulated in strength at the neighboring picture elements of the solid state image sensor or the two neighboring triads of the different color filter elements of the color filter array, accompanied by the appearance of irregular brightness. However, the brightness irregularity is very small as the pitch thereof is extremely small, and therefore, no pattern of irregular brightness substantially appears on the image of the scone being photographed.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined solely by the appended claims. In the drawings, like reference numerals denote like parts in the several views, and:

FIG. 6 is a schematic longitudinal view of a color imaging device of the type wherein an optical low pass filter according to one preferred embodiment of the present invention is employed;

FIG. 7(a) is a diagram showing the characteristic of an output signal generated when the effective periodicity of a diffraction grating is selected to be of a value equal to the periodicity of the picture elements;

FIG. 7(b) is a diagram showing the characteristic of the output signal generated when the effective periodicity of the diffraction grating is selected to be of a value two times the periodicity of the picture elements;

DETAILED DESCRIPTION OF THE EMBODIMENTS

Figure 1:
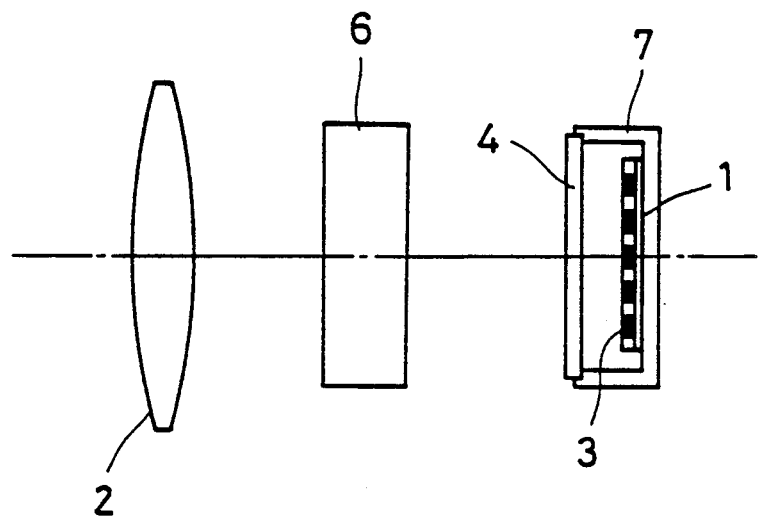
FIG. 1 is a schematic longitudinal view of the single flat panel type color imaging device of the type in which the prior art optical low pass filter is employed.
Figure 2:
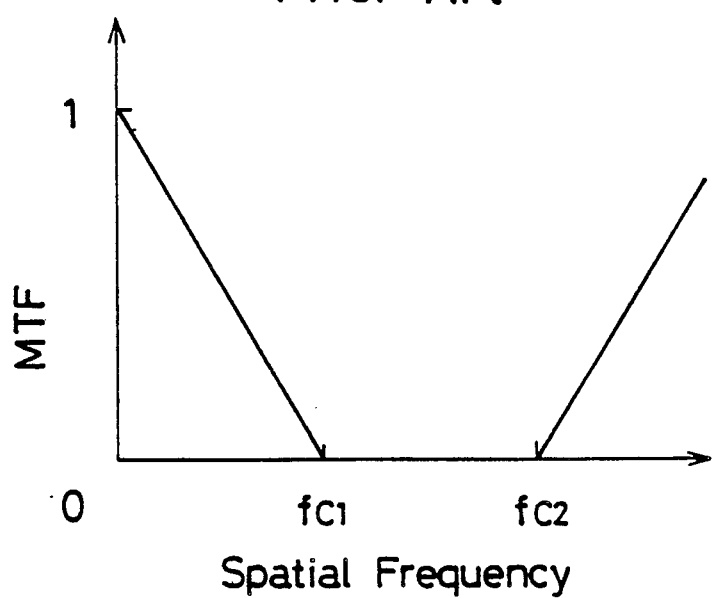
FIG. 2 is a schematic graph illustrating the modulation transfer function characteristics of the prior art optical low pass filter shown in FIG. 1.
Figure 3:
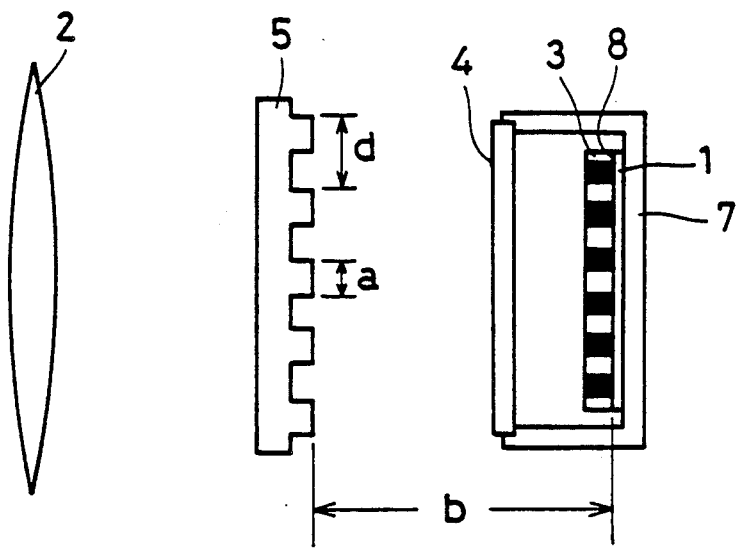
FIG. 3 is a schematic longitudinal view of the other single flat panel type color imaging device equally employing the different prior art optical low pass filter.
Figure 4:
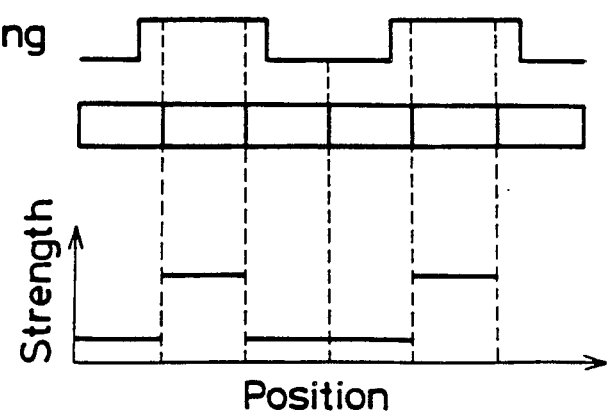
FIG. 4 is a diagram showing the characteristic of the output signal generated from the color imaging device when the effective periodicity of the diffraction grating is three times the periodicity of the picture elements of the solid state image sensor.
Figure 5:
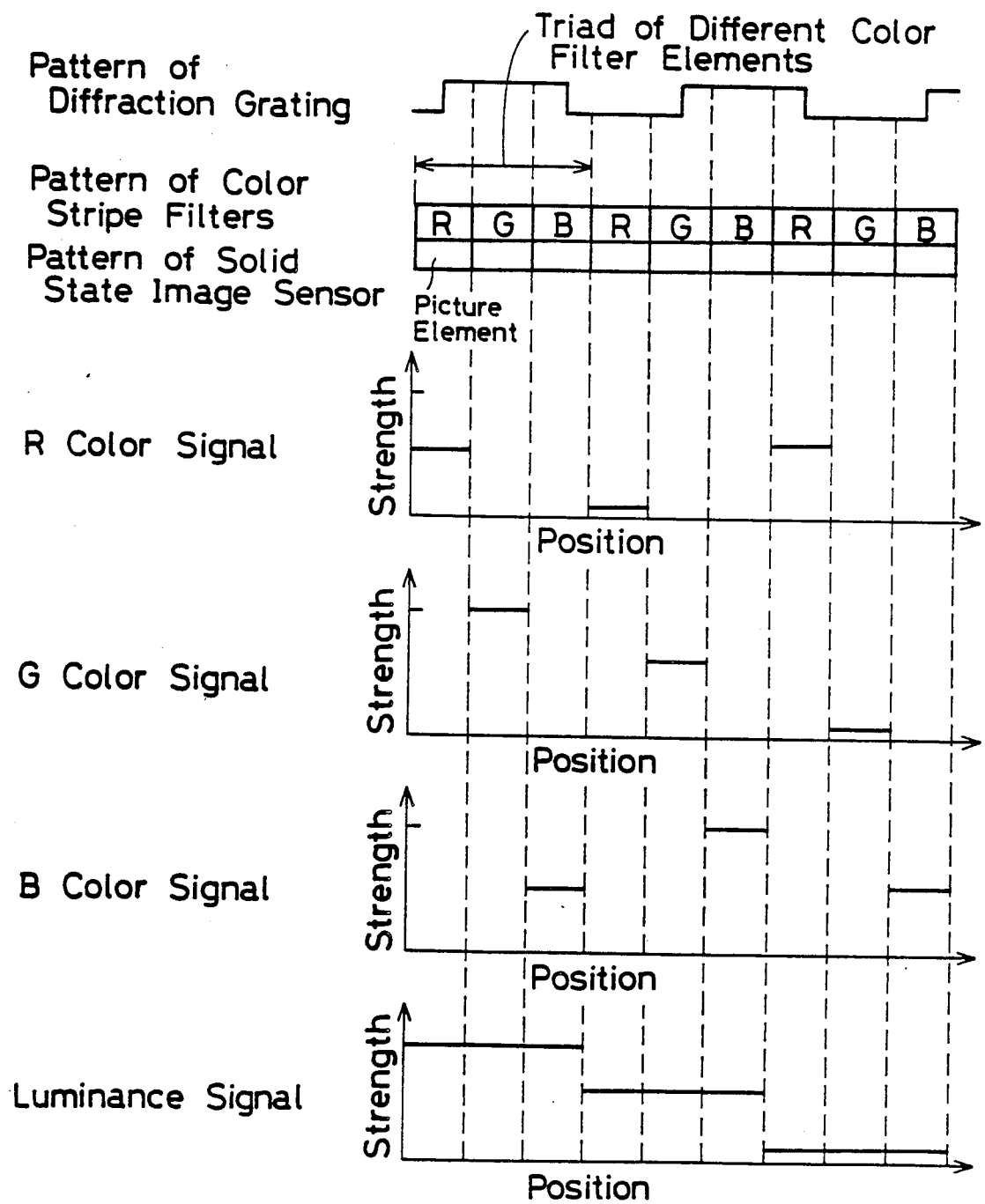
FIG. 5 is a diagram showing the characteristics of the output signals generated from the color imaging device when the effective periodicity of the diffraction grating is four times the periodicity of the picture elements.

A mono color imaging device employing an optical low pass filter according to one preferred embodiment of the present invention is schematically shown in FIG. 6. Reference numeral 1 represents a solid state image sensor encased within the casing 7 which opens towards the photo-taking lens 2. The opening of the casing 7 in opposition to the solid state image sensor 1 is closed by a transparent protective glass plate 4. One of the opposite surfaces of the protective glass plate 4 confronting the solid state image sensor 1 is formed with a diffraction grating 5 having a periodic structure 5a of minute and elongated parallel projections and grooves facing the image plane 8 or the front surface of the solid state image sensor 1. This diffraction grating layer 5 can be formed by applying a coating of photosensitive resin to such one of the opposite surfaces of the protective glass plate 4 and then scribing it by the use of any known patterning technique.

In the illustrated embodiment of FIG. 6, the periodicity of an image of the diffraction grating 5 that is, the effective periodicity of the diffraction grating 5, is selected to be of, for example, a value equal to the periodicity of picture elements of the solid state image sensor 1.

The waveform of an output signal generated when the effective periodicity of the diffraction grating is equal to the periodicity of the picture elements of the solid state image sensor 1 is shown in FIG. 7(a). In the illustrated embodiment, since the effective periodicity of the diffraction grating 5 is selected to be equal to the periodicity of the picture elements of the solid state image sensor 1, an output signal indicative of an image of a scene to be photographed which is projected by the photo-taking lens 2 onto each picture element of the solid state image sensor 1 is modulated in strength in equal amount over the entire picture elements by the diffraction grating 5 as shown in FIG. 7(a). Accordingly, even when the diaphragm is stopped down, there is no possibility that an image of the diffraction grating may appear within an image of the frame of a picture being taken of the scene.

According to a broad aspect of the present invention, since the concept of the present invention is applicable where the image of the scene projected onto the picture elements is modulated in strength equally all over the picture elements, the effective periodicity of the diffraction grating 5 may suffice to be of a value equal to 1/n, for example, ½ or ⅓, of the periodicity of the picture elements where n represents an integer, other than a value equal to the periodicity of the picture elements referred to hereinabove.

Also, according to the present invention, the effective periodicity of the diffraction grating 5 may be selected to be of a value two times the periodicity of the picture elements as shown in FIG. 7(b). With respect to the diffraction grating 5 having the effective periodicity of a value two times the periodicity of the picture elements, if the proportion of the surface irregularities of the diffraction grating 5 relative to each of the picture elements is equal as shown in FIG. 7(b), the image of the scene projected onto each of the picture elements is modulated in strength in equal amount and, therefore, no image of the diffraction grating 5 will appear within the frame of the picture being taken of the scene.

Where the periodicity of the diffraction grating 5 is selected to be of a value two times the periodicity of the picture elements, and if the diffraction grating 5 and the solid state image sensor 1 are not so positioned relative to each other as shown in FIG. 7(b), dark and bright regions formed by the diffraction grating 5 will not be averaged, however, the pitch resulting from variation in luminance is small enough to be negligible. Therefore, the diffraction grating having the effective periodicity two times the periodicity of the picture elements is to be understood as included within the scope of the present invention.

The selection of the effective periodicity of the diffraction grating 5 to be of a value which is two times or 1/n times the periodicity of the picture elements reduces the periodicity of the diffraction grating 5 itself and, therefore, in order to attain a proper cut-off frequency, that is, in order to satisfy a low frequency bandpass characteristic, it is necessary to reduce the distance b between the diffraction grating 5 and the image plane 8 as can be understood from the previously discussed equations (1) and (2). By way of example, in the imaging system wherein a charge coupled device of ½ inch in size having a plurality of picture elements each 15 μm in size is employed as the solid state image sensor in combination with the photo-taking lens of 15 mm in focal length f, and if the diffraction grating 5 employed has a periodicity d of 14.7 μm having elongated parallel projections each 9.9 μm in width, the distance b between the diffraction grating 5 and the image plane 8 of the imaging system will be 0.28 mm, with the consequence that the effective periodicity of the diffraction grating 5 assumes a value equal to the periodicity of the picture elements, giving the cut-off frequency within the range of 33 lines per millimeter to 66 lines per millimeters as shown in FIG. 8.

Figure 8:
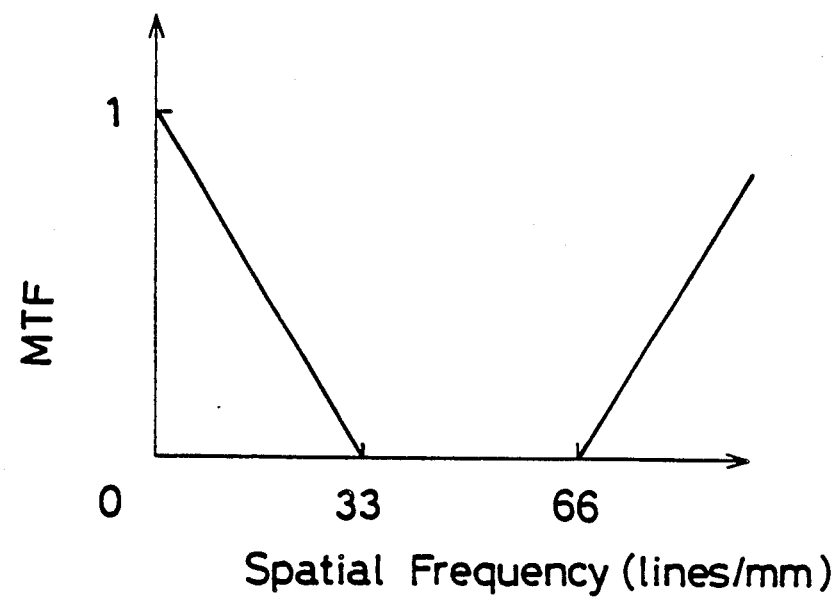
FIG. 8 is a schematic graph illustrating modulation transfer function characteristics of the optical low pass filter according to the present invention.

Also, in the same imaging system, if the diffraction grating 5 employed has a periodicity d of 28.9 μm with 9.3 μm in width a of each elongated parallel projection, the distance b between the diffraction grating 5 and the image plane 8 will be 0.55 mm, exhibiting that the effective periodicity of the diffraction grating 5 is twice the periodicity of the picture elements, giving such cut-off frequency characteristic as shown in FIG. 8.

In the embodiment now under discussion, since the diffraction grating 5 is integrally formed on the protective glass plate 4 as shown in FIG. 6, the use of the separate diffraction grating such as in the prior art is dispensed of and, therefore, the number of parts necessary in the imaging device can be reduced.

Figure 9:
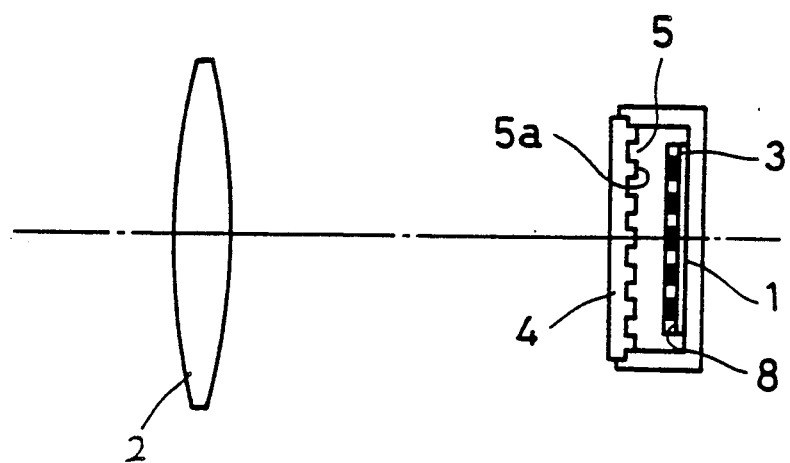
FIG. 9 is a schematic longitudinal view of the single flat panel type color imaging device employing the optical low pass filter according to another preferred embodiment of the present invention.

The case with the color imaging device will now be discussed. FIG. 9 schematically illustrate the color imaging device. In this color imaging device, a color filter array including a plurality of triads of R, G and B color filter elements, generally identified by 3, is disposed on the solid state image sensor 1 shown in FIG. 6. The other component parts employed therein are identical with those shown in FIG. 6 and are therefore shown by like reference numerals, with the details thereof not reiterated for the sake of brevity.

Figure 10:
FIG. 10 is a diagram showing characteristics of output signals generated when the effective periodicity of the diffraction grating used in the single flat panel type color imaging device is selected to be of a value equal to the periodicity of the picture elements of the solid state imaging element.
Figure 10:
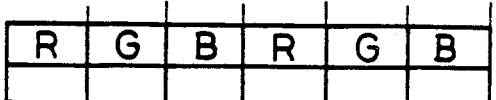
Figure 10:
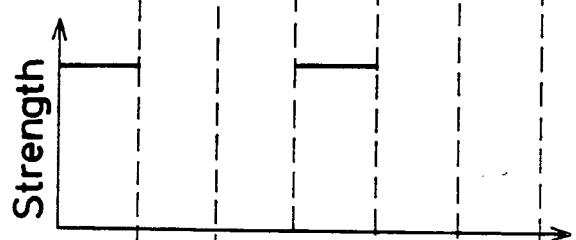
Figure 10:
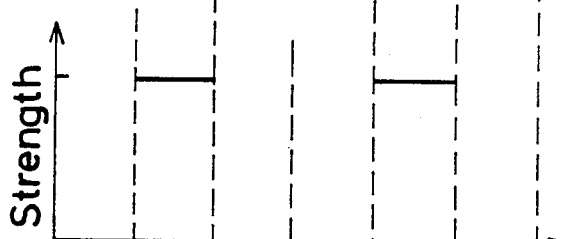
Figure 10:
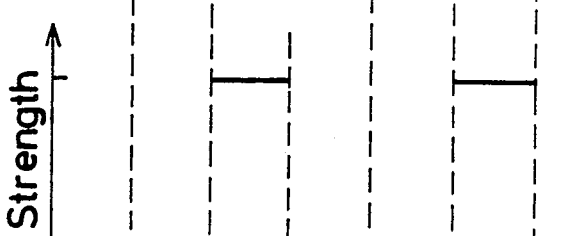
Figure 10:
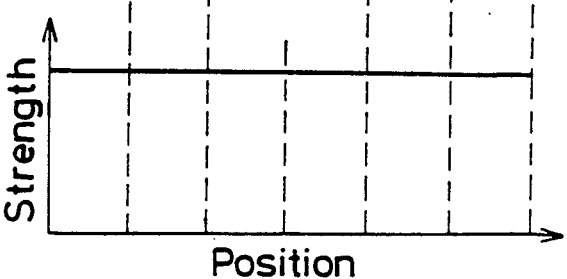

FIG. 10 illustrates characteristics of output signals generated from the color imaging device of FIG. 9 when the effective periodicity of the diffraction grating 5 is equal to the periodicity of the picture elements of the image sensing element 1. In this case, since the dark and bright regions resulting from the modulation in strength of the output signals which have been effected by the diffraction grating 5 are averaged with respect to each other, the stopping down of the diaphragm would not result in the appearance of an image of the diffraction grating 5 within the frame of the picture being taken of the scene. A similar effect can be appreciated even when the effective periodicity of the diffraction grating 5 is selected to be of a value 1/n, for example, ½, of the periodicity of the picture elements.

Figure 11:
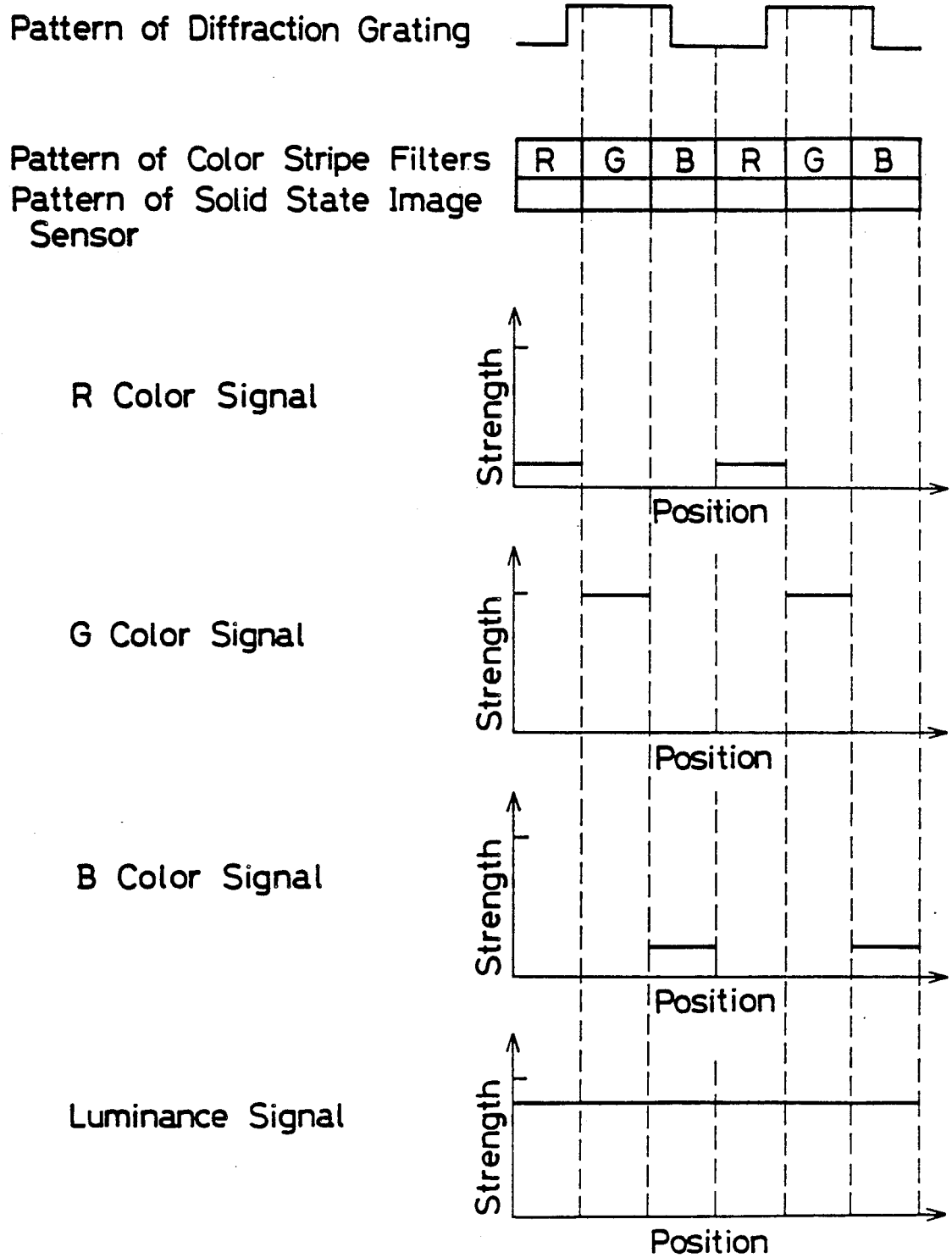
FIG. 11 is a diagram similar to FIG. 10, showing the characteristics of the output signals generated when the effective periodicity is selected to be of a value equal to the periodicity of each triad of different color filter elements of the color filter array.

FIG. 11 illustrates characteristics of the output signals generated when the effective periodicity of the diffraction grating 5 is equal to the periodicity of each triad of the different color filter elements of the color filter array. In this case, since the luminance signal is not modulated in strength by the diffraction grating 5, no appearance of the image of the diffraction grating 5 will occur within the frame of the picture being taken of the scene. However, the R, G and B color signals differ in strength from each other, a correction is necessary by way of the use of, for example, a well-known white balance compensating circuit. And, also, a similar effect can be appreciated when the effective periodicity is selected to be of a value 1/n, for example, ½, of the periodicity of each triad of the different color filter element.

Figure 12:
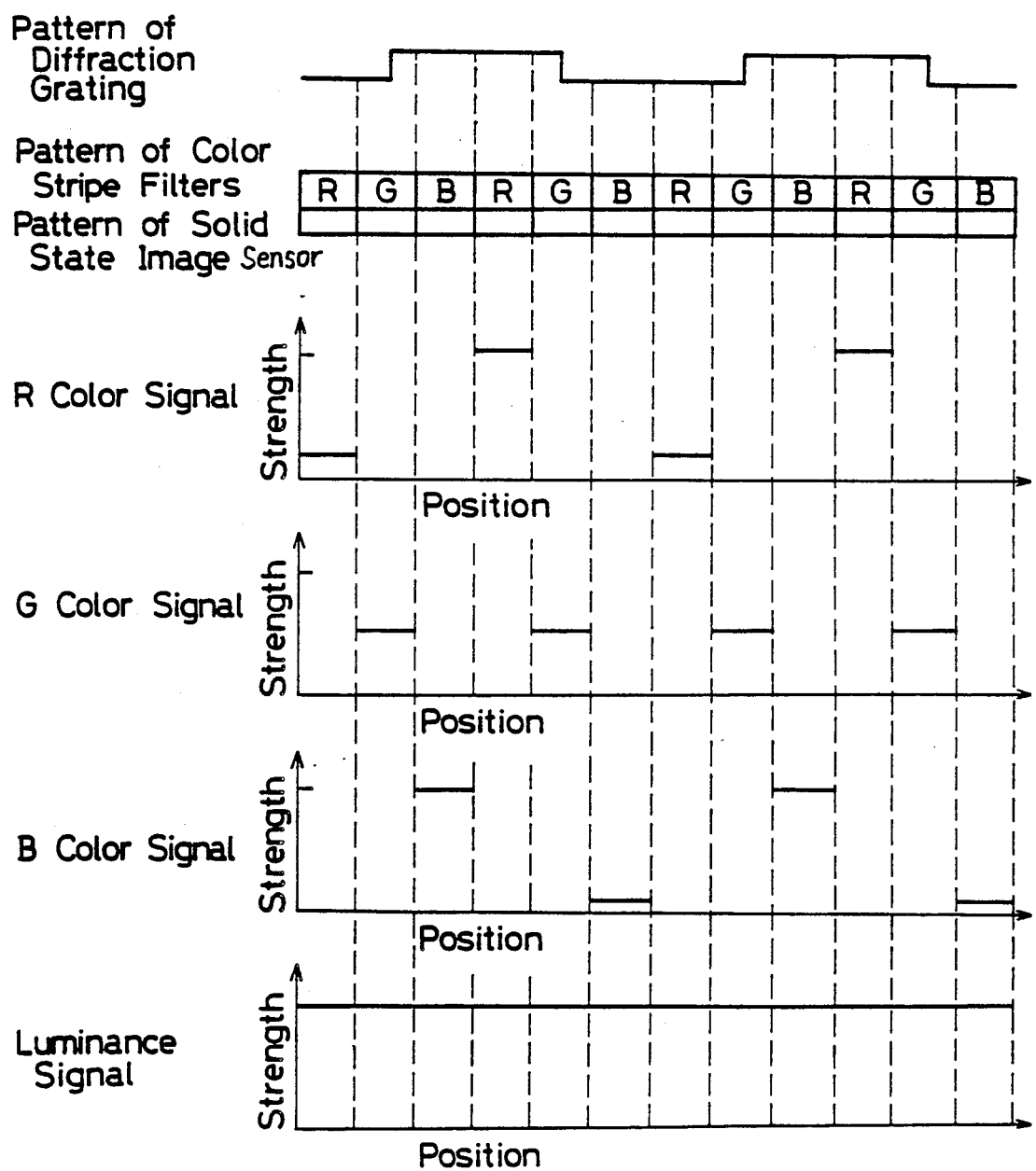
FIG. 12 is a diagram showing the characteristics of the output signals generated when the effective periodicity of the diffraction grating is selected to be of a value two times the periodicity of each triad of different color filter elements of the color filter array.

FIG. 12 illustrates characteristics of the output signals generated when the effective periodicity of the diffraction grating 5 is two times the periodicity of each triad of the different color filter elements of the color filter array. In this case, since the luminance signal is not modulated in strength by the diffraction grating 5, no appearance of the image of the diffraction grating 5 will occur within the frame of the picture being taken of the scene. However, the R, G and B color signals differ in strength from each other, an irregularity in color may occur within the frame of the picture being taken of the scene. This problem can be negligible because the periodicity of the color displacement is very small.

Where the effective periodicity of the diffraction grating at the image plane deviates from a value of two times or 1/n times the periodicity of each triad of the different color filter elements of the color filter array, or two times or 1/n times the periodicity of the picture elements of the solid state image sensor, the color irregularity may occur. However, if the difference between the number of grids of the diffraction grating at a usual picture area and the number of the picture elements or half the number of the picture elements is smaller than ½, a color compensation can readily and easily be accomplished because the resultant color irregularity is such that one color represents a varying density in the frame of the picture being taken of the scene.

While in any one of the foregoing embodiments reference has been made to the diffraction grating used in the solid state imaging device, a similar problem with the single tube type color imaging device with a color filter array can be substantially alleviated by selecting the effective periodicity of the diffraction grating used therein to be of a value two times or 1/n times the periodicity of each triad of color filter elements of the color filter array. Also, where the conventional imaging tube of an electron beam scanning type is employed, the diffraction grating may be formed on a surface of the faceplate.

Hereinafter, one example of a method of making the diffraction grating 5 shown in FIG. 9 will now be described.

As previously described, the diffraction grating 5 is formed on the surface of the protective glass plate 4 by means of a well-known patterning technique with the use of the photosensitive resin. More specifically, the diffraction grating 5 can be formed by preparing a copolymer of equal moles of methyl methacrylate and crotyl methacrylate, then, adding to the resultant copolymer a quantity of benzofenone equal in mole to the crotyl methacrylate contained in the copolymer thereby to provide a benzene solution containing 4 wt% of the photosensitive resin therein, and applying the benzene solution to the surface of the protective glass plate 4 by the use of any known spin-coating process to form a transparent photosensitive layer on the surface of the protective glass plate 4. The transparent photosensitive layer on the surface of the protective glass plate 4 is subsequently exposed to radiations (about 2,000 mJ/cm$^2$) from a super pressure mercury lamp through a patterning photo-mask for a diffraction grating, which patterning photo-mask has been placed over the transparent photosensitive layer prior to the radiation to cause molecules of benzofenone to be bonded with molecules of crotyl methacrylate. Thereafter, the glass plate 4 with the photosensitive layer formed thereon is heated at 100° C. under reduced pressure of 0.2 mmHg to remove the component of benzofenone which has not been reacted, thereby completing the formation of the generally rectangular wavy diffraction grating 5 on the glass plate 4.

It is to be noted that, in describing the details of any one of the foregoing preferred embodiments of the present invention, the diffraction grating 5 has been described as having a periodic structure similar to the shape of a battlement, that is, as being of a type having a generally rectangular wavy cross-section (a generally battlement-like cross-section). However, the present invention can be equally applicable to the diffraction grating 5 of a type having a multiple of minute parallel slits or grooves.

Also, in the practice of the present invention, in place of the diffraction grating 5 of the structure hereinbefore described, a low reflective diffraction grating such as shown by 5A in FIG. 13 and as will be subsequently described in detail may be employed.

Figure 13:
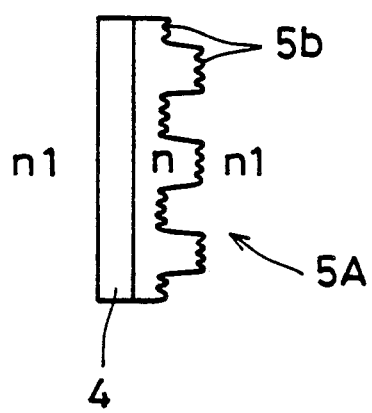
FIG. 13 is a schematic sectional view of a low reflective diffraction grating.

Referring to FIG. 13, the low reflective diffraction grating 5A has a periodic structure of parallel projections and grooves which alternate with respect to each other. Each of respective top faces of the parallel projections as well as each of bottom faces of the parallel grooves is extremely finely indented as shown generally by 5b. Because of the presence of the indentations 5b, the refractive index at the surface of the diffraction grating 5A continuously varies from a value n1 equal to the refractive index in the air to a value equal to the refractive index n of material used to form the diffraction grating 5A and, therefore, the surface of the diffraction grating 5A confronting the image sensor 1 (FIG. 6 and FIG. 9) represents a surface of substantially low reflectance. It is to be noted that the fine indentations 5b referred to above can be readily formed by the use of a well-known interference exposure technique.

Figure 14:
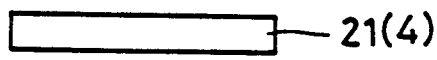
FIGS. 14(A) to 14(E) illustrate the sequence of manufacturing steps for the manufacture of the low reflective diffraction grating according to the present invention.
Figure 14:
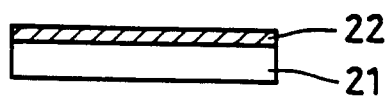
Figure 14:
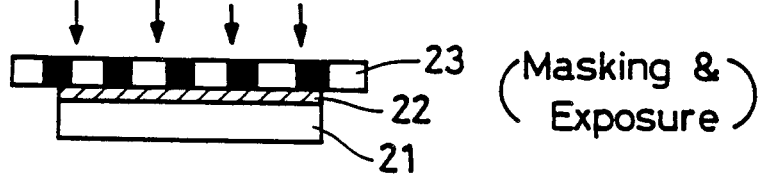
Figure 14:
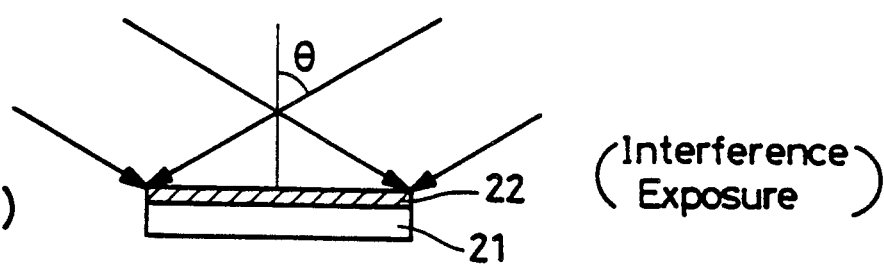
Figure 14:
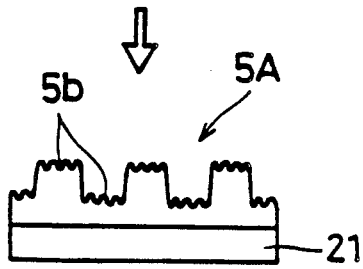

An example of the interference exposure technique to make the diffraction grating 5A in accordance with the present invention will now be described with particular reference to FIG. 14.

A transparent glass plate 21, 1 mm in thickness, which eventually serves as the protective glass plate 4 referred to hereinbefore, as shown in FIG. 14(A) is deposited on one surface thereof with a transparent photosensitive layer 22 of photosensitive resin as shown in FIG. 14(B). To prepare the photosensitive resin for the transparent photosensitive layer 22, a copolymer of equal moles of methyl methacrylate and crotyl methacrylate is first prepared and, then, benzofenone in a quantity equal in mole to the crotyl methacrylate contained in the copolymer is added to the resultant copolymer thereby to provide a benzene solution containing 4 wt% of the photosensitive resin therein.

This benzene solution is applied to the surface of the glass plate 21 by the use of any known spin-coating process to form the transparent photosensitive layer 22, referred to above, on the surface of the glass plate 21.

After the deposition of the transparent photosensitive layer 22 on the surface of the glass plate 21, and as shown in FIG. 14(C), the transparent photosensitive layer 22 is exposed to radiations, about 2,000 mJ/cm$^2$, in intensity, from a super pressure mercury lamp through a patterning photo-mask 23 for a diffraction grating, which patterning photo-mask 23 has been placed over the transparent photosensitive layer 22 prior to the radiation. Then, as shown in FIG. 14(D), the transparent photosensitive layer 22 on the glass plate 21 is exposed at a rate of about 1,000 mJ/cm$^2$ to two He-Cd laser beams of 325 nm in wavelength according to a two-beam interference exposure technique, which two laser beams are radiated to the transparent photosensitive layer 22 so as to be incident thereupon at a respective angle $\theta$ of 54.3° relative to the normal to the transparent photosensitive layer 22 from generally diagonally leftward and rightward directions, respectively. Such photo-mask exposure and two-beam interference exposure allow benzofenone to be bonded with crotyl methacrylate. Finally, the glass plate 21 with the transparent photosensitive layer 22 thereon is heated at 100° C. under reduced pressure of 0.2 mmHg to remove the component of benzofenone which has not been reacted, thereby to complete the fabrication of the low reflective diffraction grating 5A as shown in FIG. 14(E).

According to the above described method, the low reflective diffraction grating 5A could be obtained wherein the surface indentation 5b has exhibited 0.2 $\mu$m in periodicity, 0.2 $\mu$m in difference in height and 1% or less in reflectivity within the visible region of wavelength.

As hereinbefore described in detail, since the optical low pass filter comprised of the inexpensive and massproduceable diffraction grating is such that the effective periodicity of the diffraction grating is selected to be of a value twice or 1/n of the periodicity of each set of different color filter elements of the color filter array or twice or 1/n of the periodicity of the picture elements of the solid state image sensor, the undesirable possibility can be advantageously eliminated wherein an image of the diffraction grating may appear within the picture being taken of the scene. Also, since the diffraction grating is formed on the transparent protective glass plate covering the solid state image sensor or on a surface portion of the glass envelope forming a part of the image sensing tube, the present invention is also effective to provide the imaging device having a minimized number of component parts.

Although the present invention has been fully described in connection with the preferred embodiments thereof with reference to the accompanying drawings used only for the purpose of illustration, those skilled in the art will readily conceive numerous changes and modifications within the framework of obviousness upon the reading of the specification herein presented of the present invention. By way of example, although in any one of the foregoing preferred embodiments of the present invention the diffraction grating 5 or 5A has been shown and described as formed on one surface of the protective glass plate 4 or its equivalent (i.e., the surface portion of the envelope), the diffraction grating 5 or 5A may be a member separate from the protective glass plate 4 or its equivalent and, in such case, may be interposed between the protective glass plate 4 or its equivalent and the photo-taking lens 2 with or without the use of a transparent back-up substrate, if the requirements of the distance b can be satisfied.

Also, although the diffraction grating 5 or 5A has been shown and described as oriented with the grating surface facing towards the solid state image sensor, it may be positioned with the grating surface facing towards the photo-taking lens 2.

Again, although reference has been made to the use of the specific transparent photosensitive resin as material for the diffraction grating 5 or 5A, an inorganic dielectric material such as, MgF$_2$ or SiO$_2$ or any other polymer material may be used as material for the diffraction grating 5 or 5A.

Furthermore, the photo-taking lens or the pick-up lens 2, also known as the objective lens, has been shown as comprised of a single lens element, the photo-taking lens 2 is in practice made up of a plurality of lens elements or one or more groups of lens elements. Therefore, the term "objective lens" used in the appended claims is to be understood as interchangeable with the term "photo-taking lens" and as including not only a single lens element, but also a plurality of lens elements.

Accordingly, such changes and modifications are, unless they depart from the spirit and scope of the present invention as delivered from the claims annexed hereto, to be construed as included therein.

We claim:

1. An imaging device comprising: an objective lens; a solid state image sensor having formed thereon a plurality of picture elements having a periodicity; a diffraction grating disposed between the objective lens and the solid state image sensor, said diffraction grating projecting an image having a periodicity onto the solid state image sensor by the objective lens, wherein the periodicity of the projected image of the diffraction grating is selected to be twice or 1/n of the periodicity of the picture elements, wherein n represents an integer.

2. The imaging device of claim 1 further comprising:
a casing having an opening therein in one direction, said casing accommodating therein said solid state image sensor, said solid state image sensor oriented so as to receive radiations through the opening of the casing;
a protective glass plate covering the casing opening and positioned between the objective lens outside the casing and the solid state image sensor, said diffraction grating being formed on one surface of said protective glass plate.

3. An imaging device comprising:
an objective lens;
a solid state image sensor having formed thereon a plurality of picture elements;
a color filter array disposed so as to cover the picture elements of the image sensor and including a plurality of sets of different color filter elements having a periodicity;
a diffraction grating disposed between the objective lens and the solid state image sensor by the objective lens, said diffraction grating projecting an image having a periodicity onto the solid state image sensor by the objective lens, wherein the periodicity of the projected image of the diffraction grating is selected to be twice or 1/n of the periodicity of each set of the different color filter elements of the color filter array, wherein n represents an integer.

4. The imaging device of claim 3 further comprising:
a casing having an opening therein in one direction, said casing accommodating therein said solid state image sensor, said solid state image sensor oriented so as to receive radiations through the opening of the casing;
a protective glass plate covering the casing opening and positioned between the objective lens outside the casing and the solid state image sensor, said diffraction grating being formed on one surface of said protective glass plate.

5. The imaging device of claim 4, wherein the diffraction grating formed on the surface of the protective glass plate has grating surface irregularities oriented towards the solid state image sensor.

6. A single tube color imaging device comprising:
an objective lens;
an image sensing tube including an evacuated glass envelope and having an image plane where an image of a scene is focused;
a color filter array housed within the glass envelope including a plurality of sets of different color filter elements having a periodicity;
a diffraction grating disposed between the objective lens and the solid state image sensor, said diffraction grating projecting an image having a periodicity onto the solid state image sensor by the objective lens, wherein the periodicity of the projected image of the diffraction grating is selected to be twice or 1/n of the periodicity of each set of the different color filter elements of the color filter array, wherein n represents an integer.

7. The single tube color imaging device of claim 6, wherein the diffraction grating is formed on a face plate of the glass envelope which is aligned with the objective lens.

8. The single tube color imaging device of claim 6, wherein the diffraction grating formed on said face plate of the glass envelope has grating surface irregularities oriented towards the image plane.

* * * * *